United States Patent [19]

Ruff

[11] 3,763,956

[45] Oct. 9, 1973

[54] UPSET-PREVENTING DEVICES FOR TRACTORS

[76] Inventor: Herbert L. Ruff, 2058 Genesee St., Utica, N.Y. 13502

[22] Filed: Dec. 23, 1971

[21] Appl. No.: 211,599

[52] U.S. Cl. .......... 180/104, 280/112 R, 280/150 C
[51] Int. Cl. ............................................ B60k 23/00
[58] Field of Search ..................... 180/82, 103, 104, 180/100; 280/150 C, 150.5, 111, 293, 112; 200/61.52

[56] References Cited
UNITED STATES PATENTS

| | | | |
|---|---|---|---|
| 3,259,202 | 7/1966 | Griffeth | 180/104 |
| 2,917,126 | 12/1959 | Phillips | 180/104 |
| 3,397,898 | 8/1968 | Denney | 280/150 C |
| 2,750,204 | 6/1956 | Ohrmann | 280/150 C |

*Primary Examiner*—Gerald M. Forlenza
*Assistant Examiner*—John Mannix
*Attorney*—Bruns & Jenney

[57] ABSTRACT

A tractor is given some vertical play between the front wheel supported carriage and the tractor frame. One or more downwardly spring-biased rods recipocatingly supported by the frame each have its lower end in contact with a portion of the carriage and its upper end operatively supporting the operating lever of a normally open switch to hold the switch closed. The switch is connected between the tractor battery and the engine coil so as to cut off ignition to the engine when the front end of the tractor is raised enough to drop the carriage downward with respect thereto. A dashpot device is arranged between the carriage and the frame to prevent cutting off the ignition by quick downward movement of the carriage-operated rod with respect to the frame-carried switch caused by passage over rough ground. A mercury switch has its contacts arranged to complete a shutoff circuit when the tractor is tipped to a critical angle sidewise. The cutoff circuit includes a solenoid operated switch to cut the engine ignition circuit and two other solenoids arranged to initiate the transverse swinging out of a tip-over preventing arm at each side of the tractor.

2 Claims, 12 Drawing Figures

PATENTED OCT 9 1973

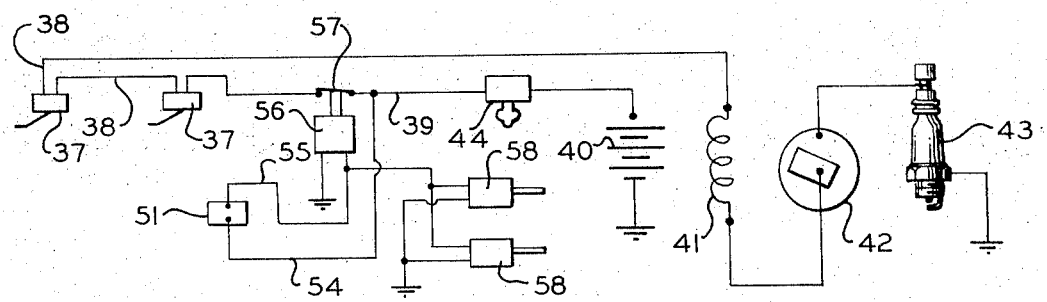
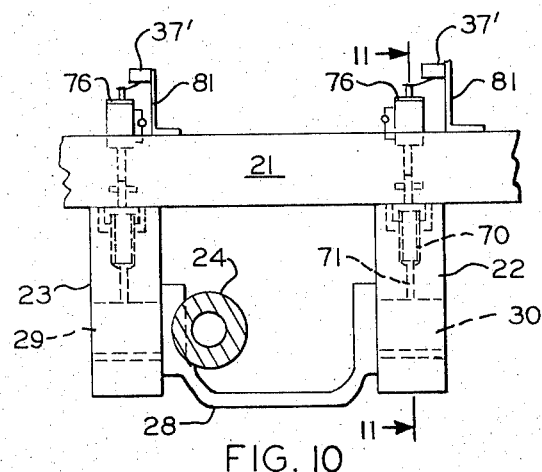
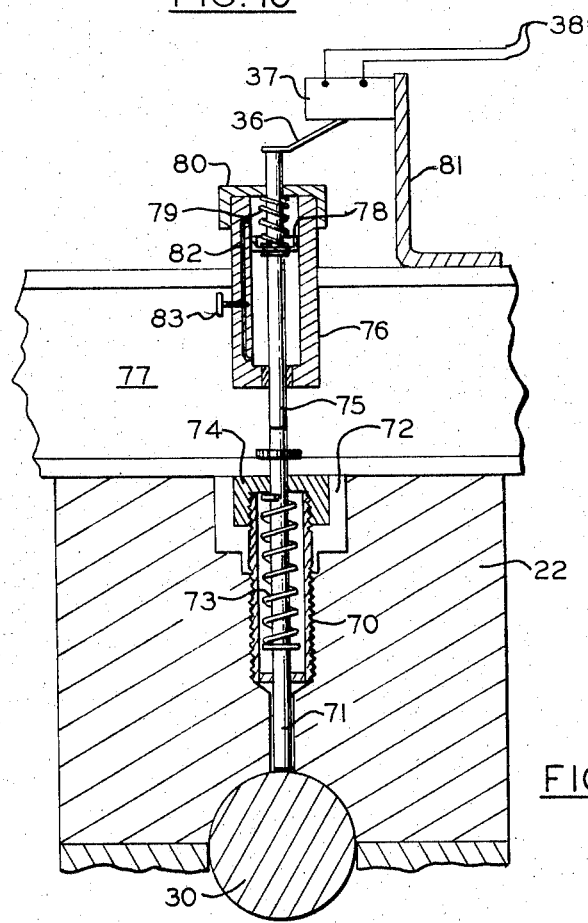
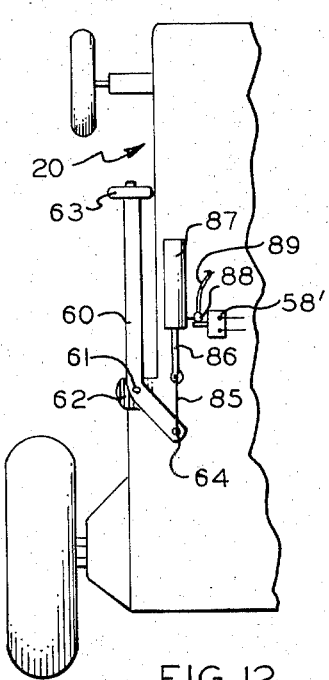
FIG. 9
FIG. 10
FIG. 11
FIG. 12

3,763,956

UPSET-PREVENTING DEVICES FOR TRACTORS

BACKGROUND OF THE INVENTION

This invention relates to means for preventing the turning over of a large tractor or earth mover longitudinally from pulling a load which is too heavy or turning it over transversely by traveling along a hillside which is too steep.

Many accidents, some fatal, have been caused by upending large tractor vehicles by pulling too heavy a load or by upsetting sideways from traveling along a hillside which is too steep.

The primary object, accordingly, is to provide means for shutting off the engine of the vehicle before it is tipped to the critical angle either longitudinally or transversely. Further protection from tipping sideways may be provided by having the same means initiate the projection sideways of a turnover-preventing arm or skid.

SUMMARY OF THE INVENTION

The invention contemplates providing a small amount of vertical play between the carriage to which the front wheels are secured and the frame of the tractor or earth mover. One type of agricultural tractor has a transversely projecting tube on either side to which the front wheels and their pivots and steering mechanism are secured. The inner ends of the tubes are secured to a fore and aft extending plate having forwardly and rearwardly projecting aligned stub shafts or trunnions at either end journalled in bearings in blocks projecting down from the tractor frame. In this type of tractor the play is provided by vertically elongating the bearings for the stub shafts.

In one embodiment smaller stub shaft extensions are provided axially of each stub shaft and a cylindrical casing secured to each frame block, the casing holding a vertically extending rod reciprocally therein. The lower end of each rod is biased downward against the extension by a spring in the casing and the upper end of the rod engaging the operating lever of a normally open switch so as to hold the switch closed. If the front end of the tractor rises so that the front wheels are off the ground the stub shafts fall in their bearings and the switches open to cut off the circuit to the engine ignition.

To prevent falling of the stub shafts caused by bouncing of the tractor over rough ground, a hydraulic dashpot device is provided, one end of its cylinder being secured to the tractor frame and the end of its piston rod secured to the fore and aft plate of the carriage. A spring in the cylinder biases the piston and the stub shafts upward. A valve controlled passage from one end of the cylinder to the other end provides adjustable timing control means for the dashpot device.

In another embodiment the rod-carrying casing is secured centrally within the downwardly extending bearing blocks of the frame and the lower ends of the rods engage the stub shafts. The upper ends of the rods normally engage the lower ends of rods extending through a pneumatic dashpot device secured to the frame, the upper ends of the dashpot rods engaging the operating arms of the normally open switches. The dashpot rods carry a piston spring-biased downward and an air passage from one end of the dashpot cylinder to the other is adjustably controlled by a needle valve so that the switches are not opened unless the stub shafts fall in their bearings for a selected period of time.

A mercury switch secured to the tractor transversely has contacts at its ends arranged to close a shutoff circuit to operate a first solenoid operated switch to open the circuit to the engine ignition and shut off the engine. The shutoff circuit may also operate a second and third solenoid to initiate the projection transversely of a tipping-preventing arm at either side of the tractor.

The tipping-preventing arms may be spring operated and the second and third solenoids operable to unlatch the arm projecting mechanism. Alternatively, the arms may be pneumatically operated and the second and third solenoids may be operable to open a valve from a supply of air under pressure to the cylinder of the arm-operating pneumatic device.

BRIEF DESCRIPTION OF THE DRAWINGS

FIG. 9 is a diagrammatical view of a circuit operable by the switches shown in FIGS. 5, 6 and 7;

FIG. 10 is a sectional view, similar to FIG. 5, showing a modified form of overturn-preventing apparatus;

FIG. 11 is a fragmentary, enlarged, sectional view on the line 11—11 of FIG. 10; and FIG. 12 is a view similar to FIG. 8 showing a modified form of transverse-overturn-preventing device.

DESCRIPTION OF THE PREFERRED EMBODIMENTS

Figure 1:
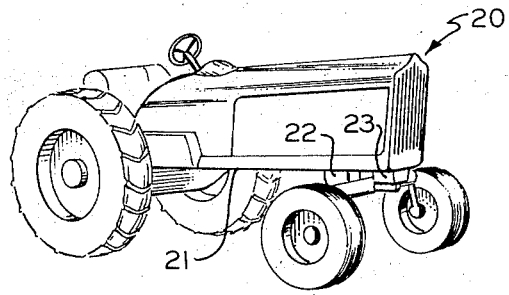
FIG. 1 is a perspective view of a tractor.
Figure 2:
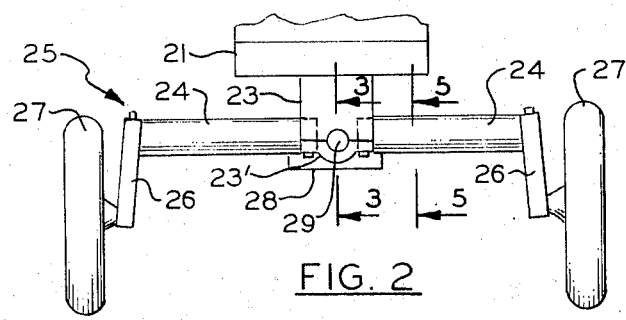
FIG. 2 is a fragmentary enlarged front elevational view of the tractor of FIG. 1.

Referring to FIGS. 1 and 2, a tractor 20 has a body frame 21 with downwardly projecting, longitudinally -spaced bearing blocks 22 and 23.

Transversely projecting tubes 24,24 of a front-wheel-supported carriage 25, terminating in downwardly projecting members 26 carrying journals for the front wheels 27 and steering means for the wheels, not shown. The inner ends of tubes 24 are integral with or welded to a fore-and-aft extending plate 28 carrying forwardly and rearwardly projecting stub shafts or trunnions 29 and 30, best seen in FIG. 3. Caps 22' and 23' are provided for the stub shaft bearings.

Figure 4:
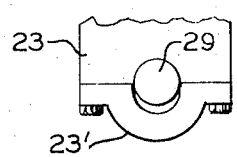
FIG. 4 is a fragmentary front elevational view of a portion of FIG. 2 illustrating means for providing play between the tractor frame and the front wheel-supported carriage.
Figure 3:
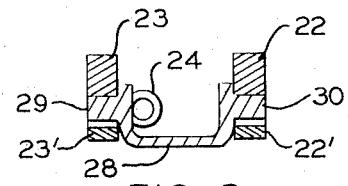
FIG. 3 is a sectional view on the line 3—3 of FIG. 2.

Referring to FIGS. 3 and 4, play is provided, of the order of ⅛ inch, between carriage 25 and the frame 21 by vertically elongating the bearing openings for the stub shafts 29 and 30, as shown.

Figure 6:
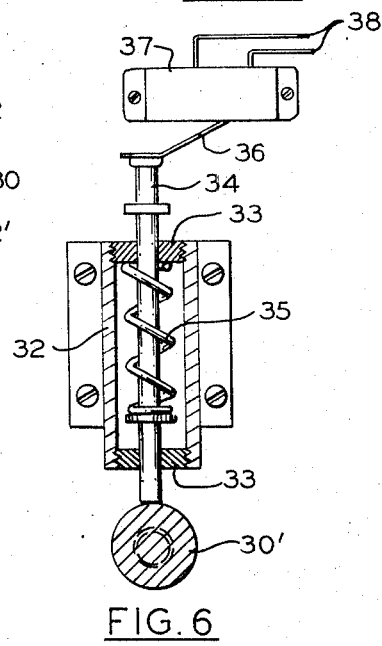
FIG. 6 is a fragmentary, enlarged sectional view on the line 6—6 of FIG. 5.
Figure 5:
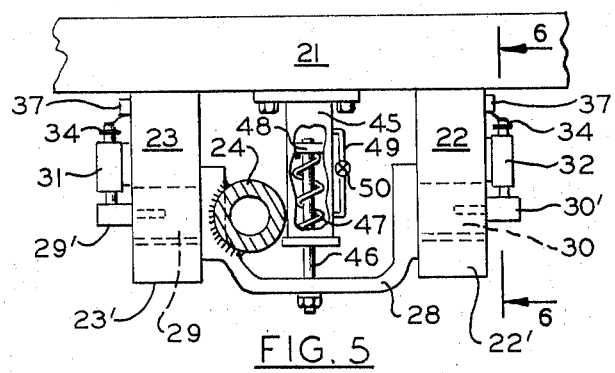
FIG. 5 is a fragmentary, enlarged sectional view on the line 5—5 of FIG. 2 certain parts being broken away for clarity.

Referring to FIG. 5, axially aligned extensions 29' and 30' are provided for the stub shafts and casings 31 and 32 are bolted to the bearing blocks 23 and 22, respectively. As best seen in the enlarged FIG. 6, the casings have annular closures 33, 33 at upper and lower ends and a vertically extending rod 34 projects through the closures at either end, the rod being biased by the spring 35 downward against the shaft extension. At its upper end, rod 34 normally operatively engages the operating arm 36 of a normally open micro-switch 37 so as to normally hold the switch closed.

It will now be apparent that, when the driving force exerted by the rear drive wheels of the tractor becomes great enough to lift the front wheels of the tractor off the ground, the carriage 25 will fall carrying stub shafts 29 and 30 downward in their bearings and opening the two switches 37.

Each switch 37 has a pair of lead wires 38-38 and, referring to FIG. 9, the switches 37 are connected in series between a line 39 from the tractor electrical supply 40 and the tractor motor represented by coil 41, distributor 42 and spark plug 43. Line 39 is provided with the usual key operated ignition switch 44.

To prevent either of the switches 37 from being opened by the front wheels 27 bouncing over a rough road or rough ground, a dashpot or timer device 45 is provided. Referring again to FIG. 5, one end of the cylinder of the device 45 is secured to carriage 21 and its piston rod 46 is secured to the plate 28. The device 45 is hydraulic, its cylinder being filled with oil, and a compression spring 47 extends from its piston 48 to the free end of the cylinder. An hydraulic line 49 extends from one end of the cylinder to the other, the line 49 being provided with the usual regulating valve 50. It will be apparent that the spring 47 and the regulated flow of hydraulic fluid will prevent switches 37 from being operated by any brief dropping of carriage 25 caused by rough ground.

Figure 7:
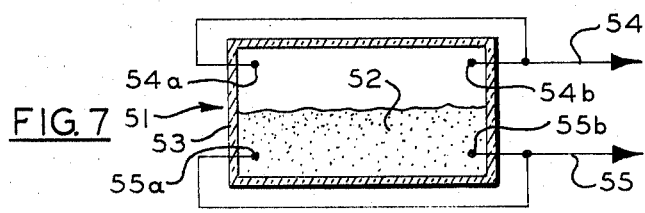
FIG. 7 is a diagrammatical, longitudinal sectional view of a mercury switch.

Tractor 20 is also provided with a device to prevent transverse tipping and to shut the motor off before such tipping may occur. Referring to FIG. 7, a mercury switch 51 is shown half-filled with mercury 52. The switch case 53 is rectangular in the section shown and is adapted to be secured, by means not shown, so as to extend transversely of the tractor on any normally level flat surface of the tractor. The switch has upper and lower contacts 54a and 55a at one end and upper and lower contacts 54b and 55b at its other end. Contacts 54a and 54b are electrically connected to a lead wire 54 and contacts 55a and 55b are connected to lead wire 55. If the tractor tips to one side contacts 54a and 55a are electrically connected by the mercury and if it tips in the other direction contacts 54b and 55b are electrically connected.

Referring again to FIG. 9, the lead 54 is connected through ignition switch 44 to the electrical source 40 and lead 55 is connected to operate a solenoid 56 which, when operated, opens a normally closed switch 57 in line 39 and shuts off the tractor motor.

It will be apparent that, if the tractor is diesel-powered, a relay may be substituted for the coil 41, timer 42 and plug 43, the relay being arranged to shut off a valve in the fuel supply close to the injector when the relay is deactivated.

Besides shutting off the tractor motor, the switch 51 may also be used to activate a pair of solenoids 58,58, one at each side of the tractor for initiating the transverse projection of an arm to prevent sideward tipping of the tractor. Referring again to FIG. 9, the solenoids 58,58 are connected in series between lead 55 of switch 51 and ground.

Figure 8:
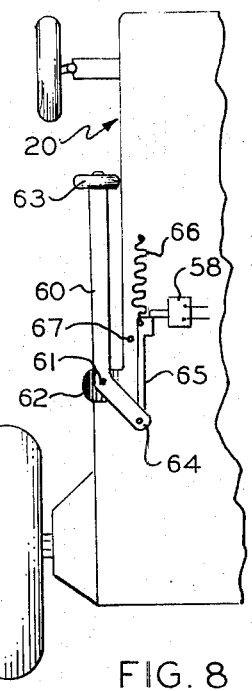
FIG. 8 is a fragmentary, diagrammatical plan view of one side of a tractor.

Referring to FIG. 8, a crank arm 60 on one side of the tractor 20 is pivotally secured at 61 to a transversely projecting plate 62 which projects downwardly as well as transversely, as indicated. The longer leg of arm 60 terminates in a wheel or skid 63 for contacting the ground. The shorter interior leg of arm 60 is pivotally connected at 64 to one end of a bar 65. The other end of bar 65 is engaged by the armature of one solenoid 58 as a detent, operation of the solenoid 58 withdrawing its armature detent. Bar 65 is biased forward by a contraction spring 66 and a stop 67 is provided for the shorter leg of arm 60.

A mirror image of the apparatus shown at FIG. 8 is provided for the other side of the tractor, the operation of each being initiated by operation of switch 51. It will be apparent that two switches can be provided, the one without contacts 54b and 55b and the other without contacts 54a and 55a. The first would initiate operation of the apparatus shown in FIG. 8 only when the tractor tips to the left, the other would initiate operation of similar apparatus at the right side only when the tipping is to the right.

It will also be apparent that a similar mercury switch disposed fore-and-aft of the tractor could be used instead of the apparatus shown in FIGS. 3–6.

A modified form of such apparatus is shown in FIGS. 10 and 11. The casing 70 for oscillatably supporting a push-rod 71 is threadedly secured in a hole 72 extending vertically in each of the bearing blocks 22 and 23 as shown in FIG. 10. This construction has the advantage that separate lubrication for the rod 71 need not be provided since the stub shafts are lubricated in their bearings.

The rod 71 is biased downward by a spring 73, as shown, and an annular cap 74 for the upper end of casing 70 is provided. The upper end of rod 71 is engaged by an axially aligned piston rod 75 extending from a pneumatic cylinder 76 supported, by means not shown, on a frame cross-member 77. The piston 78 on the rod 75 is biased downward by a spring 79 and the rod 75 extends upward through the piston and spring and through an annular cap 80 to engage the operating lever 36 of a switch 37 just like the switch 37 of FIG. 6, supported on a frame member 81.

The pneumatic cylinder 76 has an air passage 82 extending from the upper end of the cylinder to its lower end, as shown, the passage being adjustably controlled by a needle valve 83. It will be apparent that this arrangement of a pneumatic dashpot device between the rod 71 and switch 37 functions like the hydraulic dashpot device 45 of FIG. 5 but may be lighter and more economically furnished than the latter.

Referring now to FIG. 12, a modified form of apparatus for extending an anti-tip arm 60 is shown. The shorter leg of the crank arm 60 is secured by a link 85 to the end of a piston rod 86 projecting from the end of a pneumatic cylinder 87. A solenoid 58′, electrically connected as shown for solenoid 58 in FIG. 9, operates when actuated to open a valve 88 in a pressure line 89, fragmentarily shown, leading to a source of air under pressure, not shown, on the tractor. When valve 88 is opened, air is admitted to the cylinder 87 and piston rod 86 is withdrawn, swinging the arm 60 outwardly and downwardly, so that its wheel or skid 63 can contact the ground to prevent tipping.

It will be apparent that other means for extending the arm 60 may be provided such as a pneumatic ram for thrusting the arm 60 transversely or other motor means.

It will also be apparent that means for providing play between the carriage 25 or wheels 27 and the tractor frame, other than that shown in FIGS. 3 and 4, may also be provided and spring-biased lever means may be substituted for the vertically reciprocable rod carried by the frame supported casing.

I claim:

1. An unupsetable tractor vehicle having front and rear wheels, a body frame, a motor for driving the rear wheels and a front wheel carriage directly supported by the front wheels and connected to the frame, comprising: a portion of the carriage having vertical play with respect to the frame, a casing secured to the frame, an elongated member oscillatably carried by the casing, one end of the member being biased downward against the carriage portion and the other end of the member normally being operatively engaged with the operating arm of a frame-carried first cutoff switch, the cutoff switch being electrically arranged to shut off the vehicle motor when the member other end moves with respect to the cutoff switch in response to the front wheels rising off the ground and, supported by the carriage, are carried by the frame elevated above the ground; a dashpot timer device connected between the frame and the carriage portion to prevent operation of the cutoff switch by rapid up and down movement of the carriage portion; mercury switch means secured to the frame and having electrical contacts arranged to initiate operation of frame-carried motor means when the frame tips transversely to a critical angle, the motor means including motor means for operating a second cutoff switch to stop the vehicle motor; and at least one arm oscillatably secured to the frame and transversely moveable to an extended position for contacting the ground at the side of the vehicle to prevent transverse tipping beyond the critical angle, the motor means including means for initiating transverse extension of the arm.

2. In a tractor vehicle having front and rear wheels, a body frame, a motor mounted on the frame for driving the rear wheels and including a source of electrical current and motor cylinder ignition devices connected in an ignition circuit, and a front wheel carriage directly supported by the front wheels, the carriage having fore and aft extending shaft means and the frame having bearing block members providing journals for the shaft means for pivotally securing the carriage to the frame, means for preventing the upending of the tractor by pulling too heavy a load, comprising; the shaft means of the carriage having substantial vertical play with respect to the block members of the frame, a vertically disposed elongated member oscillatably carried by each block member and guided for axial movement with respect thereto, one end of each elongated member being biased downward against the carriage shaft means and the other end of the elongated member normally being operatively engaged with the piston rod of a dashpot timer device, the timer cylinder being secured to the frame and adapted to axially align the piston rod with the elongated member and guide the rod for vertical axial movement within the cylinder, a cutoff switch supported by the frame above each block member, the cutoff switches being electrically connected in series in the ignition circuit, each timer rod being adapted to normally hold its respective switch contacts closed and to adapt the switch contacts to open when the front wheels rise off the ground and, supported by the carriage, are carried above the ground causing the carriage shaft means to fall within its block means because of the play so that the elongated members fall; the timer means being adjusted for a time delay in the falling of its rod after the elongated members fall to prevent opening of the switches when the front wheels bounce rapidly over rough ground and whereby the motor is stopped before the vehicle can rear over backwards when the vehicle is pulling too heavy a load.

* * * * *